(12) United States Patent
Mofardin et al.

(10) Patent No.: US 11,100,472 B2
(45) Date of Patent: Aug. 24, 2021

(54) SYSTEMS AND COMPUTER IMPLEMENTED METHODS FOR MONITORING AN ACTIVITY AT ONE OR MORE FACILITIES

(71) Applicant: South East Water Corporation, Frankston (AU)

(72) Inventors: Eddy Mofardin, Caulfield South (AU); Luke Butler, Bentleigh East (AU); Claire Pucovski, Cranbourne East (AU); Adrian Blinman, Ringwood North (AU)

(73) Assignee: SOUTH EAST WATER CORPORATION, Heatherton (AU)

( * ) Notice: Subject to any disclaimer, the term of this patent is extended or adjusted under 35 U.S.C. 154(b) by 190 days.

(21) Appl. No.: 15/517,099

(22) PCT Filed: Oct. 23, 2015

(86) PCT No.: PCT/AU2015/050657
§ 371 (c)(1),
(2) Date: Apr. 5, 2017

(87) PCT Pub. No.: WO2016/061631
PCT Pub. Date: Apr. 28, 2016

(65) Prior Publication Data
US 2018/0268377 A1    Sep. 20, 2018

(30) Foreign Application Priority Data

Oct. 23, 2014 (AU) .............................. 2014904243

(51) Int. Cl.
*G06Q 10/00* (2012.01)
*G06F 16/29* (2019.01)
(Continued)

(52) U.S. Cl.
CPC ............. *G06Q 10/30* (2013.01); *G05B 15/02* (2013.01); *G05D 7/0635* (2013.01); *G06F 16/29* (2019.01);
(Continued)

(58) Field of Classification Search
CPC .......... G08G 1/00; G08G 1/123; G06Q 10/06; G06Q 10/30; G06F 16/29; G05B 15/02
See application file for complete search history.

(56) References Cited

U.S. PATENT DOCUMENTS 6,024,142 A * 2/2000 Bates .................... B67D 7/145
                                                                141/351
6,232,915 B1 5/2001 Dean et al.
(Continued)

FOREIGN PATENT DOCUMENTS

JP    2003016579 A    1/2003
JP    2004091150 A    3/2004
(Continued)

OTHER PUBLICATIONS

International Search Report (4 pages) and Written Opinion (11 pages) prepared by the Australian Patent Office as International Searching Authority for PCT International Patent Application No. PCT/AU2015/050657, dated Jan. 18, 2016.
(Continued)

*Primary Examiner* — Michael Roswell
(74) *Attorney, Agent, or Firm* — Kilpatrick Townsend & Stockton LLP

(57) ABSTRACT

Some embodiments facilitate remote monitoring of an activity at one or more facilities by a vehicle. Data is received at a communications interface from a remote device that is co-located with the vehicle. The data includes a vehicle identifier and a vehicle location indicator. A zone data record is accessed. The zone data record includes a plurality of
(Continued)

zones, each zone having a virtual geographical boundary associated with a physical geographical area including at least one facility. It is determined that the vehicle is located within a zone of the zone data record for a preconfigured period of time based on the vehicle location indicator and the zone data record. Responsive to determining that the vehicle is located within the zone for the preconfigured period, performance of the activity at the one or more facilities by the vehicle is determined.

19 Claims, 5 Drawing Sheets

(51) Int. Cl.
    *G06Q 10/08*     (2012.01)
    *G05B 15/02*     (2006.01)
    *G05D 7/06*     (2006.01)

(52) U.S. Cl.
    CPC ..... *G06Q 10/0832* (2013.01); *G06Q 10/0833* (2013.01); *Y02W 90/00* (2015.05)

(56) References Cited

U.S. PATENT DOCUMENTS

| | | | |
|---|---|---|---|
| 6,253,129 B1* | 6/2001 | Jenkins | G07C 5/008 340/438 |
| 6,609,064 B1 | 8/2003 | Dean | |
| 10,140,785 B1* | 11/2018 | Cox | G01F 9/02 |
| 2002/0188382 A1* | 12/2002 | Sherwood | G05D 7/0635 700/282 |
| 2013/0021174 A1* | 1/2013 | Silzer, Sr. | G05D 1/0278 340/989 |
| 2013/0090966 A1 | 4/2013 | Rivere | |
| 2013/0291999 A1 | 11/2013 | Orcutt et al. | |
| 2015/0324943 A1 | 11/2015 | Han et al. | |
| 2016/0048795 A1* | 2/2016 | Walton | G06Q 10/063114 705/7.15 |

FOREIGN PATENT DOCUMENTS

| | | |
|---|---|---|
| JP | 2004355520 A | 12/2004 |
| JP | 2005017195 A | 1/2005 |
| JP | 2006249919 A | 9/2006 |
| JP | 2008070377 A | 3/2008 |
| JP | 2012053732 A | 3/2012 |
| WO | 2008050711 A1 | 5/2008 |
| WO | 2014089163 A2 | 6/2014 |

OTHER PUBLICATIONS

CareTrack [retrieved from Internet on Apr. 5, 2017] <URL: https://itunes.apple.com/us/app/caretrack/id858559488?mt=8> published May 30, 2014.
EP15851718.5, "Extended European Search Report", dated Mar. 1, 2018, 9 pages.
JP2017-522357, "Office Action", dated Sep. 3, 2019, 11 pages.

* cited by examiner

SYSTEMS AND COMPUTER IMPLEMENTED METHODS FOR MONITORING AN ACTIVITY AT ONE OR MORE FACILITIES

CROSS-REFERENCE TO RELATED APPLICATIONS

This application is a national phase of PCT International Application Number PCT/AU2015/050657, filed on Oct. 23, 2015, which claims the benefit of Australian Patent Application Number 2014904243, filed on Oct. 23, 2014. Each of these applications is hereby incorporated by reference in its entirety for all purposes.

TECHNICAL FIELD

Described embodiments relate to systems and computer implemented methods for monitoring of an activity by a vehicle at one or more facilities. Some embodiments relate to monitoring for hydrant usage at one or more hydrants. Some embodiments relate to monitoring for collection of fats/oils from one or more interceptors. Some embodiments relate to monitoring for collection of waste from one or more septic tanks. Some embodiments relate to monitoring for collection of trade waste from sewer systems. Some embodiments relate to the disposal or discharge of fluids, such as fats/oils, septic waste and/or trade waste, at one or more facilities, such as treatment points.

BACKGROUND

Many water companies actively monitor usage of their water hydrants to ensure that revenue can be collected for water withdrawn or to determine whether water has been taken from unauthorised hydrants. For example, in some cases, taking water from unauthorised or forbidden hydrants can cause dirty water to be conveyed to residential properties.

In many cases, the water companies rely on the honesty of water carters taking water from the hydrants to monitor hydrant usage. For example, some water transport vehicles are provided with a GPS/GSM enabled unit having a manually actuatable switch, which when actuated, causes the GPS/GSM enabled unit to send a signal to a monitoring system to indicate that water has been taken from a hydrant. The signal may provide information, such as a vehicle ID and a location of the unit when the button was pushed, and may be employed by the monitoring system for billing the company associated with the water transport vehicle. However, there may be a significant proportion of water carters who do not always push the button when drawing water due to forgetfulness, driver changes, time pressures or other reasons. As a consequence, there may be significant revenues not being captured.

Other systems for monitoring hydrant usage by water transport vehicles comprise a fluid sensor installed in or at a water tank of the water transport vehicle and a GPS/GSM enabled unit arranged to transmit a tank fill signal and/or an tank discharge signal to a monitoring system associated with the water company in response to receiving a signal from the fluid sensor indicating that the tank is being filled with fluid, such as water, and/or fluid is being discharged from the tank, respectively. The tank fill signal may provide information, such as a vehicle ID and a location of the unit when the sensor signal was received by the unit, to the monitoring system and may be employed for billing the company associated with the water transport vehicle. However, such systems are often unreliable and can be expensive to purchase and intrusive to install.

In many other industries, contractors are employed and in some cases, licenced, by clients to provide vehicle-based services, such as sewage and waste water removal and disposal, for example. For billing purposes, the contractors tend to log details of the services and issue clients with invoices for the service performed. This can be a time consuming process and may be prone to invoicing errors.

It is desired to address or ameliorate one or more shortcomings of known methods and systems for monitoring hydrant usage and/or other activities, or to at least provide a useful alternative thereto. Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a monitoring system for remote monitoring of an activity at one or more facilities by a vehicle, the system comprising a monitoring unit including program memory and a processor, the program memory accessible by the processor to execute instructions stored therein; and a communications interface for communicating with a remote device across a communications network, the remote device being co-located with the vehicle; wherein the processor is configured to execute instructions stored in the memory to: receive at the communications interface data from the remote device, the data comprising a vehicle identifier and a vehicle location indicator; access a zone data record, the zone data record comprising a plurality of zones, each zone having a virtual geographical boundary associated with a physical geographical area including at least one facility; determine whether the vehicle is located within a zone of the zone data record for a preconfigured period of time based on the vehicle location indicator and the zone data record; and responsive to determining that the vehicle is located within the zone for the preconfigured period, determine that the activity has been performed at the one or more facilities by the vehicle.

The monitoring system may further comprise data memory for storing a preconfigured period of time.

In some embodiments, the preconfigured period of time may comprise a time range having a lower threshold value and an upper threshold value, and wherein the vehicle may be determined to be located within a zone of the zone data record for a preconfigured period of time when the vehicle is determined to be located within the zone for a time period that falls within the time range. The preconfigured period of time may be based on at least one of a vehicle identifier, capacity of a tank associated with the vehicle, zone of the zone data record, and driver details of driver associated with the vehicle.

In some embodiments, the zone data record may be stored in data memory and the processor may be configured to execute instructions stored in the program memory to access the data record from data memory. In some embodiments, the processor may be configured to execute instructions stored in program memory to access the zone data record from a remote data storage device via the communications interface. The zone data record may comprise a dynamic zone map.

A vehicle record may be stored in data memory and may comprise information pertaining to the vehicle including at least one of vehicle identifier, driver identifier, tank capacity, vehicle restrictions, driver disabilities, driver details, driver permitted locations and driver behaviour.

In some embodiments, the one or more facilities may comprise a hydrant, the activity may comprise hydrant usage and determining that the activity has been performed may comprise determining usage of at least one hydrant by the vehicle. In some embodiments, the activity may comprise collection of fats and/or oils from one or more fats and/or oils interceptors of the one or more facilities and determining that the activity has been performed may comprise determining collection of fats and/or oils from one or more fats and/or oils interceptors by the vehicle. In some embodiments, the activity may comprise collection of waste from one or more septic tanks of the one or more facilities and determining that the activity has been performed may comprise determining collection of waste from one or more septic tanks by the vehicle, In some embodiments, the activity may comprise collection of trade waste from sewer systems associated with the one or more facilities and determining that the activity has been performed may comprise determining collection of trade waste from the sewer systems by the vehicle. In some embodiments, the activity may comprise disposal or discharge of fluids, such as fats/oils, septic waste and/or trade waste, from a tank or tanker carried by the vehicle at the one or more facilities and determining that the activity has been performed may comprise determining disposal or discharge of fluids from the tank or tanker carried by the vehicle at the one or more facilities. For example, the one or more facilities may comprise treatment points.

Some embodiments relate to a monitoring device for monitoring of an activity at one or more facilities by a vehicle associated with the monitoring device, the monitoring device comprising: a control unit including program memory and a processor, the program memory accessible by the processor to execute instructions stored therein; and a communications interface for communicating with a remote server across a communications network; wherein the processor is configured to execute instructions stored in the memory to: receive at the communications interface data comprising a location indicator associated with a location of the monitoring device; access a zone data record, the zone data record comprising a plurality of zones, each zone having a virtual geographical boundary associated with a physical geographical area including at least one facility; determine whether the monitoring device is located within a zone of the zone data record for a preconfigured period of time based on the location indicator and the zone data record; and responsive to determining that the monitoring device is located within the zone for the preconfigured period, determine that the activity has been performed at the one or more facilities by a vehicle associated with the monitoring device.

The processor may be configured to execute instructions stored in the memory to transmit a charging action to the remote server.

In some embodiments. the monitoring device may further comprise data memory for storing a preconfigured period of time. The preconfigured period of time may comprise a time range having a lower threshold value and an upper threshold value, and the monitoring device may be determined to be located within a zone of the zone data record for a preconfigured period of time when the monitoring device is determined to be located within the zone for a time period that falls within the time range. In some embodiments, the preconfigured period of time may be based on at least one of a vehicle identifier, capacity of a tank associated with the vehicle, zone of the zone data record, and driver details of driver associated with the vehicle.

The zone data record may be stored in data memory and the processor may be configured to execute instructions stored in the program memory to access the data record from data memory. The processor may be configured to execute instructions stored in program memory to access the zone data record from a remote data storage device via a communications interface. The zone data record may comprise a dynamic zone map.

A vehicle record may be stored in data memory and may comprise information pertaining to the vehicle including at least one of vehicle identifier, driver identifier, tank capacity, vehicle restrictions, driver disabilities, driver details, driver permitted locations and driver behaviour.

In some embodiments, the device may further comprise a communications interface for communicating with the remote server across the communications network, a Global Positioning System (GPS) receiver for receiving location information specifying the geographic location of the GPS receiver, and/or a user interface to allow a user to interact with the monitoring device. The user interface may comprise a selection mechanism actuatable to cause the processor to execute instructions stored in the memory to cause to signal to be transmitted to the remote server.

In some embodiments, the one or more facilities may comprise a hydrant, the activity may comprise hydrant usage and determining that the activity has been performed may comprise determining usage of at least one hydrant by the vehicle. In some embodiments, the activity may comprise collection of fats and/or oils from one or more fats and/or oils interceptors of the one or more facilities and determining that the activity has been performed may comprise determining collection of fats and/or oils from one or more fats and/or oils interceptors by the vehicle. In some embodiments, the activity may comprise collection of waste from one or more septic tanks of the one or more facilities and determining that the activity has been performed may comprise determining collection of waste from one or more septic tanks by the vehicle, In some embodiments, the activity may comprise collection of trade waste from sewer systems associated with the one or more facilities and determining that the activity has been performed may comprise determining collection of trade waste from the sewer systems by the vehicle. In some embodiments, the activity may comprise disposal or discharge of fluids, such as fats/oils, septic waste and/or trade waste, from a tank or tanker carried by the vehicle at the one or more facilities and determining that the activity has been performed may comprise determining disposal or discharge of fluids from the tank or tanker carried by the vehicle at the one or more facilities. For example, the one or more facilities may comprise treatment points.

Some embodiments relate to a communications system for monitoring an activity at one or more facilities by vehicles, the system comprising: a monitoring system as described above and a monitoring device as described above.

Some embodiments relate to a computer implemented method for remote monitoring of an activity at one or more facilities by a vehicle, the method operable by a monitoring system including program memory and a processor, the method comprising: receiving data at a communications interface of the monitoring system from a remote device across a communications network, the remote device being co-located with the vehicle and the data comprising a vehicle identifier and a vehicle location indicator; accessing a zone data record, the zone data record comprising a plurality of zones, each zone corresponding to a virtual geographical boundary associated with a physical geographical area including at least one facility; determining whether the vehicle is located within a zone of the zone data record for a preconfigured period of time based on a comparison of the vehicle location indicator and the zone data record; and responsive to determining that the vehicle is located within the zone for the preconfigured period, determining that that the activity has been performed at the one or more facilities by the vehicle.

In some embodiments, determining whether the vehicle is located within a zone of the zone data record for a preconfigured period of time may comprise determining a time spent by the vehicle in the zone and comparing the determined time with the preconfigured period of time. For example, determining a time spent by the vehicle in the zone may comprise responsive to determining that the vehicle is located within a zone of the zone data record, starting a timer and responsive to determining that the vehicle is no longer located within the zone, stopping the timer.

In some embodiments, the method may further comprise instigating a charging action.

In some embodiments, the one or more facilities may comprise a hydrant, the activity may comprise hydrant usage and determining that the activity has been performed may comprise determining usage of at least one hydrant by the vehicle. In some embodiments, the activity may comprise collection of fats and/or oils from one or more fats and/or oils interceptors of the one or more facilities and determining that the activity has been performed may comprise determining collection of fats and/or oils from one or more fats and/or oils interceptors by the vehicle. In some embodiments, the activity may comprise collection of waste from one or more septic tanks of the one or more facilities and determining that the activity has been performed may comprise determining collection of waste from one or more septic tanks by the vehicle, In some embodiments, the activity may comprise collection of trade waste from sewer systems associated with the one or more facilities and determining that the activity has been performed may comprise determining collection of trade waste from the sewer systems by the vehicle. In some embodiments, the activity may comprise disposal or discharge of fluids, such as fats/oils, septic waste and/or trade waste, from a tank or tanker carried by the vehicle at the one or more facilities and determining that the activity has been performed may comprise determining disposal or discharge of fluids from the tank or tanker carried by the vehicle at the one or more facilities. For example, the one or more facilities may comprise treatment points.

In some embodiments, the method may further comprise transmitting a message to a computing device associated with the vehicle to query whether a tank fill event and/or tank discharge event occurred (and/or the activity was performed) and responsive to receiving a response from the computing device indicating that a tank fill event and/or tank discharge event did not occur (and/or the activity was not performed), recording the response in a data record associated with the vehicle. In some embodiments, the method may further comprise transmitting a message to a computing device associated with the vehicle to query whether a tank fill event and/or tank discharge event occurred (and/or the activity was performed) and responsive to not receiving a response from the computing device within a predefined period indicating that a tank fill event and/or tank discharge event did not occur (and/or the activity was not performed), instigating a charging action. For example, the computing device may be at least one of the remote device, a smart phone and a tablet.

The method may further comprise responsive to determining that at least one hydrant within the zone is an unauthorised hydrant, recording the vehicle as having used an unauthorised hydrant.

The method may further comprise responsive to receiving a tank fill event signal and/or tank discharge event signal (and/or confirmation of performance of the activity) from the remote device, recording the location identifier of the remote device at that time as a potentially positive indication of a location to be included within a zone of the zone data record. The method may further comprise responsive to not receiving a tank fill event signal (and/or tank discharge event signal and/or confirmation of performance of the activity) from the remote device within a defined period, recording the lack of response in a data record associated with the vehicle.

The method may further comprise responsive to determining that the monitoring device is located within the zone, issuing an instruction to a valve control mechanism of a tank carried by the vehicle to cause the valve control mechanism to open a valve of the tank to allow for fluid to be conveyed to or from the tank and responsive to determining that the monitoring device is no longer located within the zone, issuing an instruction to the valve control mechanism to cause the valve control mechanism to close the valve of the tank to disallow for fluid to be conveyed to or from the tank.

The method may further comprise responsive to determining that the monitoring device is located within the zone, issuing an instruction to a mechanism of the one or more facilities to cause the mechanism to unlock to allow for fluid to be conveyed to or from the one or more facilities and responsive to determining that the monitoring device is no longer located within the zone, issuing an instruction to the mechanism to cause the mechanism to lock to disallow for fluid to be conveyed to or from the one or more facilities.

Some embodiments relate to a computer implemented method for monitoring of an activity at one or more facilities by a vehicle co-located with a monitoring device, the method operable by the monitoring device including program memory and a processor, the method comprising: receiving data at a communications interface of the monitoring device, the data comprising a location indicator; accessing a zone data record, the zone data record comprising a plurality of zones, each zone corresponding to a virtual geographical boundary associated with a physical geographical area including at least one facility; determining whether the monitoring device is located within a zone of the zone data record for a preconfigured period of time based on a comparison of the location indicator and the zone data record; and responsive to determining that the monitoring device is located within the zone for the preconfigured period, determining that that the activity has been performed at the one or more facilities by the vehicle co-located with the monitoring device.

In some embodiments, determining whether the monitoring device is located within a zone of the zone data record for a preconfigured period of time may comprise determining a time spent by the monitoring device in the zone and comparing the determined time with the preconfigured period of time. For example, determining a time spent by the monitoring device in the zone may comprise responsive to determining that the monitoring device is located within a zone of the zone data record, starting a timer and responsive to determining that the vehicle is no longer located within the zone, stopping the timer.

The method may further comprise transmitting from the communications interface of the monitoring device a charging action to a remote server.

In some embodiments, the one or more facilities may comprise a hydrant, the activity may comprise hydrant usage and determining that the activity has been performed may comprise determining usage of at least one hydrant by the vehicle. In some embodiments, the activity may comprise collection of fats and/or oils from one or more fats and/or oils interceptors of the one or more facilities and determining that the activity has been performed may comprise determining collection of fats and/or oils from one or more fats and/or oils interceptors by the vehicle. In some embodiments, the activity may comprise collection of waste from one or more septic tanks of the one or more facilities and determining that the activity has been performed may comprise determining collection of waste from one or more septic tanks by the vehicle, In some embodiments, the activity may comprise collection of trade waste from sewer systems associated with the one or more facilities and determining that the activity has been performed may comprise determining collection of trade waste from the sewer systems by the vehicle. In some embodiments, the activity may comprise disposal or discharge of fluids, such as fats/oils, septic waste and/or trade waste, from a tank or tanker carried by the vehicle at the one or more facilities and determining that the activity has been performed may comprise determining disposal or discharge of fluids from the tank or tanker carried by the vehicle at the one or more facilities. For example, the one or more facilities may comprise treatment points.

In some embodiments, the method may further comprise transmitting a message to a computing device associated with the vehicle to query whether a tank fill event and/or tank discharge event occurred (and/or the activity was performed) and responsive to receiving a response from the computing device indicating that a tank fill event and/or tank discharge event did not occur (and/or the activity was not performed), recording the response in a data record associated with the vehicle. In some embodiments, the method may further comprise transmitting a message to a computing device associated with the vehicle to query whether a tank fill event and/or tank discharge event occurred (and/or the activity was performed) and responsive to not receiving a response from the computing device within a predefined period indicating that a tank fill event and/or tank discharge event did not occur (and/or the activity was not performed), instigating a charging action.

The method may further comprise responsive to determining that at least one hydrant within the zone is an unauthorised hydrant, recording the vehicle as having used an unauthorised hydrant.

The method may further comprise responsive to receiving a tank fill event signal and/or tank discharge event signal (and/or confirmation of performance of the activity) from a user interface of the monitoring device, recording the location identifier at that time as a potentially positive indication of a location to be included within a zone of the zone data record. The method may further comprise responsive to not receiving a tank fill event signal and/or tank discharge event signal (and/or confirmation of performance of the activity) from a user interface of the monitoring device within a defined period, recording the lack of response in a data record associated with the vehicle.

The method may further comprise responsive to determining that the monitoring device is located within the zone, issuing an instruction to a valve control mechanism of a tank carried by the vehicle to cause the valve control mechanism to open a valve of the tank to allow for fluid to be conveyed to or from the tank and responsive to determining that the monitoring device is no longer located within the zone, issuing an instruction to the valve control mechanism to cause the valve control mechanism to close the valve of the tank to disallow for fluid to be conveyed to or from the tank.

The method may further comprise responsive to determining that the monitoring device is located within the zone, issuing an instruction to a mechanism of the one or more facilities to cause the mechanism to unlock to allow for fluid to be conveyed to or from the one or more facilities and responsive to determining that the monitoring device is no longer located within the zone, issuing an instruction to the mechanism to cause the mechanism to lock to disallow for fluid to be conveyed to or from the one or more facilities.

Some embodiments relate to a computer program product comprising a non-transitory computer readable medium encoded with computer executable instructions, which when executed in a computer system, is effective to cause the computer system to carry out the steps of the methods described above.

BRIEF DESCRIPTION OF DRAWINGS

Embodiments are described in further detail below, by way of example, with reference to the accompanying drawings, in which.

DESCRIPTION OF EMBODIMENTS

Described embodiments relate to systems and computer implemented methods for monitoring an activity at one or more facilities by a vehicle. For example, the activity may comprise a tank fill event and/or a tank discharge event relating to a tank carried by the vehicle.

In some embodiments, the one or more facilities may comprise a hydrant and the activity may comprise hydrant usage. In some embodiments, the one or more facilities may comprise a commercial and/or industrial organisation and the activity may comprise collection of fats and/or oils from one or more fats and/or oils interceptors of the organisation. In some embodiments, the one or more facilities may comprise a domestic property and the activity may comprise collection of waste from one or more septic tanks of the property. In some embodiments, the one or more facilities may comprise an industrial plant or factory and the activity may comprise collection of trade waste from sewer systems associated with the plant or factory. In some embodiments, the one or more facilities may comprise a treatment point and the activity may comprise disposal or discharge of fluids, such as fats/oils, septic waste and/or trade waste, from a tank or tanker carried by the vehicle at treatment points.

In some embodiments, a monitoring device is co-located with the vehicle, such as a tank carrying vehicle. For example, the monitoring device may be disposed in or mounted to the vehicle. The monitoring device is configured to determine and transmit data, including location data and a vehicle or monitoring device identifier, to a monitoring system located remotely from the monitoring device. The monitoring system is configured to receive and process the data to determine whether or not a tank fill event and/or tank discharge event has occurred based on the location data and a zone data record, such as a zone map, comprising a plurality of zones, each zone corresponding to a virtual geographical boundary or geofence associated with a physical geographical area in which at least one facility is physically located.

In some embodiments, the monitoring device is configured to determine and process location data to determine whether or not a tank fill event and/or tank discharge event signal has occurred based on the location data and a zone data record, such as a zone map, comprising a plurality of zones, each zone corresponding to a virtual geographical boundary or geofence associated with a physical geographical area in which at least one facility is physically located.

Described embodiments may provide a reliable, tamper proof, and relatively low cost system and method for monitoring activities such as tank fill events or tank discharge events at a facility by a vehicle. Furthermore, some embodiments do not require the hardwiring of any systems or devices into the vehicle being monitored.

Figure 1:
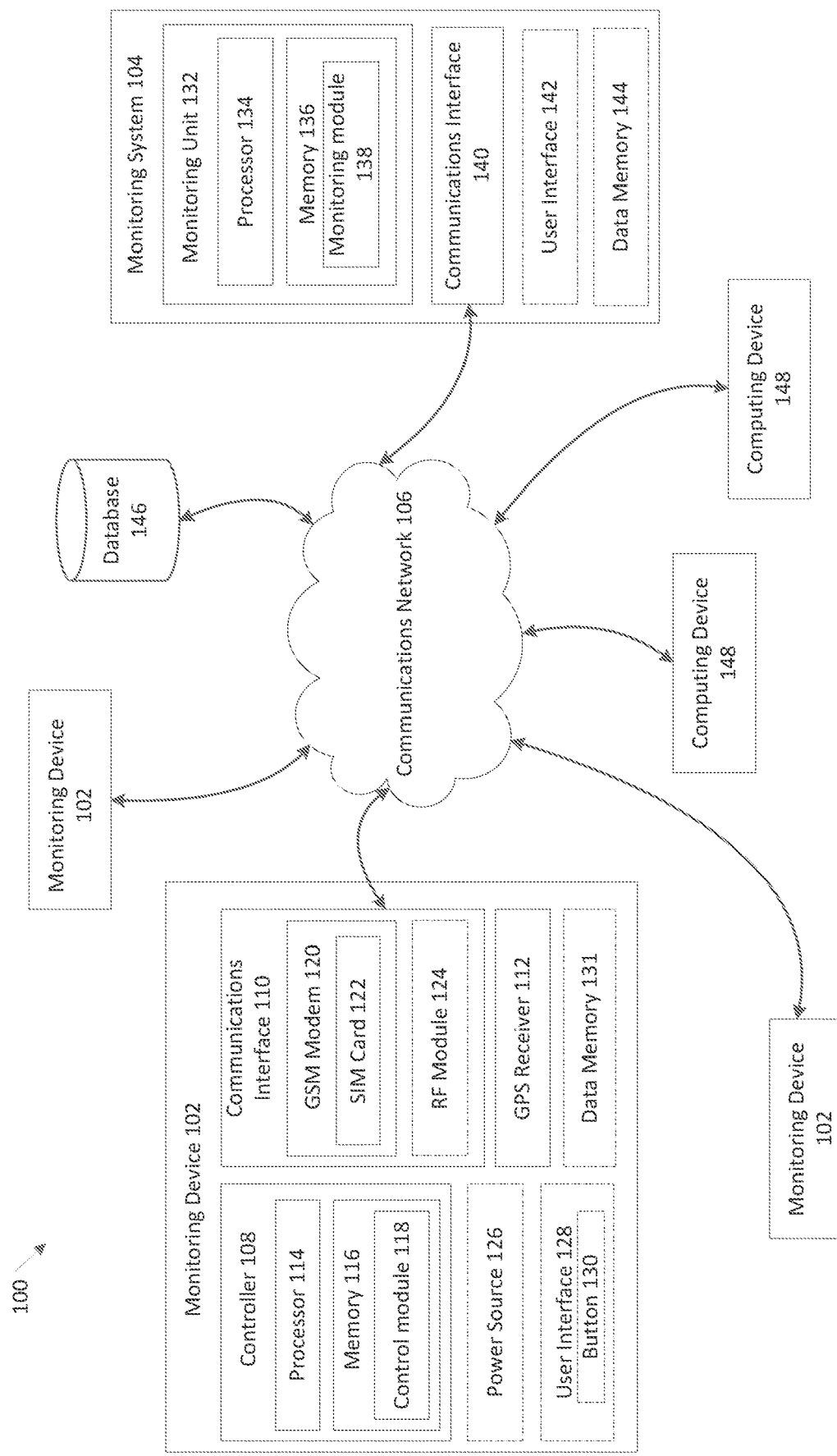
FIG. 1 is a schematic illustration of a communications system comprising a plurality of monitoring devices in communication with a monitoring system across a communications network, according to some embodiments.

Referring to FIG. 1, there is illustrated a communications system 100 comprising a plurality of monitoring devices 102 in communication with a monitoring system 104 across a communications network 106, according to some embodiments. For example, the communications network 106 may comprise a wireless communications network, such as the mobile phone network or a wireless computer network. In some embodiments, the communications system 100 comprises a client-server architecture in which the monitoring devices 102 are configured as client computing devices and the monitoring system 104 is configured as a server system.

As depicted in FIG. 1, the monitoring device 102 comprises a controller 108, a communications interface 110, and a Global Positioning System (GPS) receiver 112. In some embodiments, the monitoring device 102 is housed within a container (not shown), such as a PVC container.

The controller 108 comprises a processor 114 (which may include multiple processing components operating together) and a memory 116. The memory 116 may comprise a combination of volatile and non-volatile computer readable storage and has sufficient capacity to store program code executable by the processor 114 in order to perform appropriate processing functions as described herein. For example, the memory 116 includes a control module 118 comprising program code, which when executed by the processor 114 is arranged to cause the controller 108 to interact with the communications interface 110 to communicate with the monitoring system 104 and/or to perform methods of monitoring activities at one or more facilities by a vehicle, such as hydrant usage, as will be discussed in more detail with reference to FIG. 3 and FIG. 5.

The communications interface 110 may comprise suitable hardware and software interfaces to facilitate wired and/or wireless communication with the monitoring system 104 across the communications network 106, such as transmitters, receivers and antennas. In some embodiments, the communications interface 110 comprises a GSM modem 120 including a subscriber identity module (SIM) card 122 to enable communications over a mobile phone network. In some embodiments, the communications interface 110 may comprise a radio frequency (RF) module 124 such as a short range wireless (Wi-Fi) communication module to enable communications over a local wireless communications network or the communications interface 110 may comprise a long range wireless communication module, for example, a 900 MHz radio communications module, to enable longer range communications across the communications network 106.

The controller 108 is configured to determine a location of the monitoring device 102 using the GPS receiver 112. For example, the GPS receiver 112 may receive satellite data from GPS satellites indicating location information specifying the geographic location of the GPS receiver 112 at a given time. The processor 114 is configured to execute program code stored in the memory 116 to cause the controller to determine location data for the monitoring device 102 based on the satellite data. For example, the location data may comprise a latitude coordinate and a longitude coordinate and time stamp. In some embodiments, the satellite data and/or the location data may be stored in the memory 116 or in another local memory of the monitoring device 102 such as data memory 131 or an external memory associated with the monitoring device 102.

The control module 118 may comprise program code, which when executed by the processor 114, causes the controller 108 to interact with the communications interface 110 to transmit data to the monitoring system 104. In some embodiments, the controller 108 may be configured to transmit the location data to the monitoring system 104 continuously (or sufficiently regular as to be effectively continuous), for example, in response to determining the location data from the satellite data received from the GPS receiver 112, or the controller 108 may be configured to transmit the location data to the monitoring system 104 periodically, at pre-set intervals. In some embodiments, the controller 108 may be configured to transmit instructions or commands to a remote server, such as the monitoring system 104, for example, to instigate a charging action associated with a determined tank fill event or tank discharge event.

In some embodiments, the monitoring device 102 comprises a power source 126. For example, the power source 126 may comprise a long-life battery, such as a lithium battery. In some embodiments, the monitoring device 102 may be arranged to be disposed or mounted within a vehicle and may be configured to cooperate with or connect to a vehicle power source, which may be a DC connector within the vehicle, for example, a 12 Volt socket or cigarette lighter receptacle. In some embodiments, the monitoring device 102 may arranged to be disposed within the vehicle and hardwired into the vehicle's electric circuits. In other embodiments, the monitoring device 102 may be may arranged to be mounted externally of the vehicle, for example, toward an inlet of a tank carried by the vehicle, and may be battery powered and/or hardwired into the vehicle's electric circuits. In some embodiments, the power source 126 may comprise any suitable power charging mechanism, such as a solar power charging mechanism for example.

In some embodiments, the monitoring device 102 may comprise a user interface 128 to allow a user to interact with the monitoring device 102, for example, to provide inputs to control a supply of power to the device 102 and/or receive outputs, such as an indication of reception or battery consumption. For example, the user interface 128 may comprise a graphical user interface, a voice user interface, and/or a touchscreen. In some embodiments, the user interface 128 comprises a selection mechanism, such as a button 130, to allow a user to selectively activate transmission of a signal to the monitoring system 104, for example, to indicate that a tank fill event or tank discharge event has occurred. For example, the control module 118 may comprise program code, which when executed by the processor 114, may be arranged to cause the controller 108 to interact with the communications interface 110 to transmit a signal to the monitoring system 104 in response to receiving an input from the selection mechanism.

In some embodiments, the monitoring device 102 comprises a data memory 131 for storing data received via the communications interface 110 and/or the user interface 128 and/or data generated by the controller 108.

The monitoring system 104 comprises a monitoring unit 132 including a processor 134 (which may include multiple processing components operating together) and a program memory 136. The memory 136 may comprise a combination of volatile and non-volatile computer readable storage and may have sufficient capacity to store program code executable by the processor 134 in order to perform appropriate processing functions as described herein. For example, the memory 136 may include a monitoring module 138 comprising program code, which when executed by the processor 134 is arranged to cause the monitoring unit 132 to perform methods of monitoring activities at one or more facilities by a vehicle, such as hydrant usage, as will be discussed in more detail with reference to FIGS. 3 and 4.

The monitoring system 104 comprises a communications interface 140 having suitable hardware and software interfaces to facilitate wired and/or wireless communication with a plurality of monitoring devices 102 and/or other computing devices 148 across the communications network 106. For example, the communications interface 140 may comprise any kind of data port used to receive data, such as a network connection, a memory interface, a pin of the chip package of processor 134, or logical ports, such as IP sockets or functions stored on program memory 136 and executable by processor 134.

In some embodiments, the monitoring system 104 may comprise a user interface 142 to enable the monitoring system 104 to receive information from a user and/or to output or display information. For example, the user interface 142 may comprise a graphical user interface, a voice user interface, and/or a touchscreen. In some embodiments, the user interface 142 may be capable of communicating or interacting with a browser application (not shown) running on the monitoring device 102 or on a remote computing device 148 to enable interaction with a user, such as to receive information from the user and/or to output or display information to the user. For example, the monitoring system 104 may be configured to serve code to provide an interactive user interface for a user viewing a display generated by the browser application (not shown) and viewable on a screen of the user interface 128.

In some embodiments, the monitoring system 104 comprises a data memory 144 for storing data received via the communications interface 140 and/or the user interface 142 and/or data generated by the monitoring unit 132.

The monitoring device and/or the monitoring unit 132 are configured to access a zone data record, such as a zone map, associated with a physical geographical region, in which at least one facility is physically located, in order to perform a method of monitoring activities at one or more facilities by a vehicle according to some embodiments. For example, in some embodiments, the zone data record may comprise a table having one or more entries. Each entry may comprise an identifier of one or more facilities and an associated physical geographical region or zone which includes the physical location of the one or more facilities. The zone map may be stored locally in data memory 131 and/or data memory 144 or may be stored remotely, for example at a remote database 146 accessible to the monitoring device 102 via the communications network 106 using the communications interface 110 and/or to the monitoring system 104 via the communications network 106 using the communications interface 140 or may be stored on an external memory device (not shown) accessible via a memory interface (not shown) of the communications interface 110 and/or the communications interface 140.

In some embodiments, the zone data record comprises a hydrant zone data record, such as a hydrant zone map, associated with a physical geographical region in which at least one hydrant is physically located, in order to perform a method of monitoring hydrant usage according to some embodiments. In some embodiments, the zone data record comprises a facility zone data record, such as a facility zone map or table, associated with a physical geographical region in which at least one facility having one or more fats and/or oils interceptors is physically located, in order to perform a method of monitoring collection of fats and/or oils from one or more fats and/or oils interceptors of the at least one facility according to some embodiments. In some embodiments, the zone data record comprises a facility zone data record, such as a facility zone map or table, associated with a physical geographical region in which at least one facility having one or more septic tanks is physically located, in order to perform a method of monitoring collection of waste from one or more septic tanks of the at least one facility according to some embodiments. In some embodiments, the zone data record comprises a facility zone data record, such as a facility zone map or table, associated with a physical geographical region in which at least one facility associated with a sewer system is physically located, in order to perform a method of monitoring collection of trade waste from sewer systems associated with the at least one facility according to some embodiments.

Figure 2:
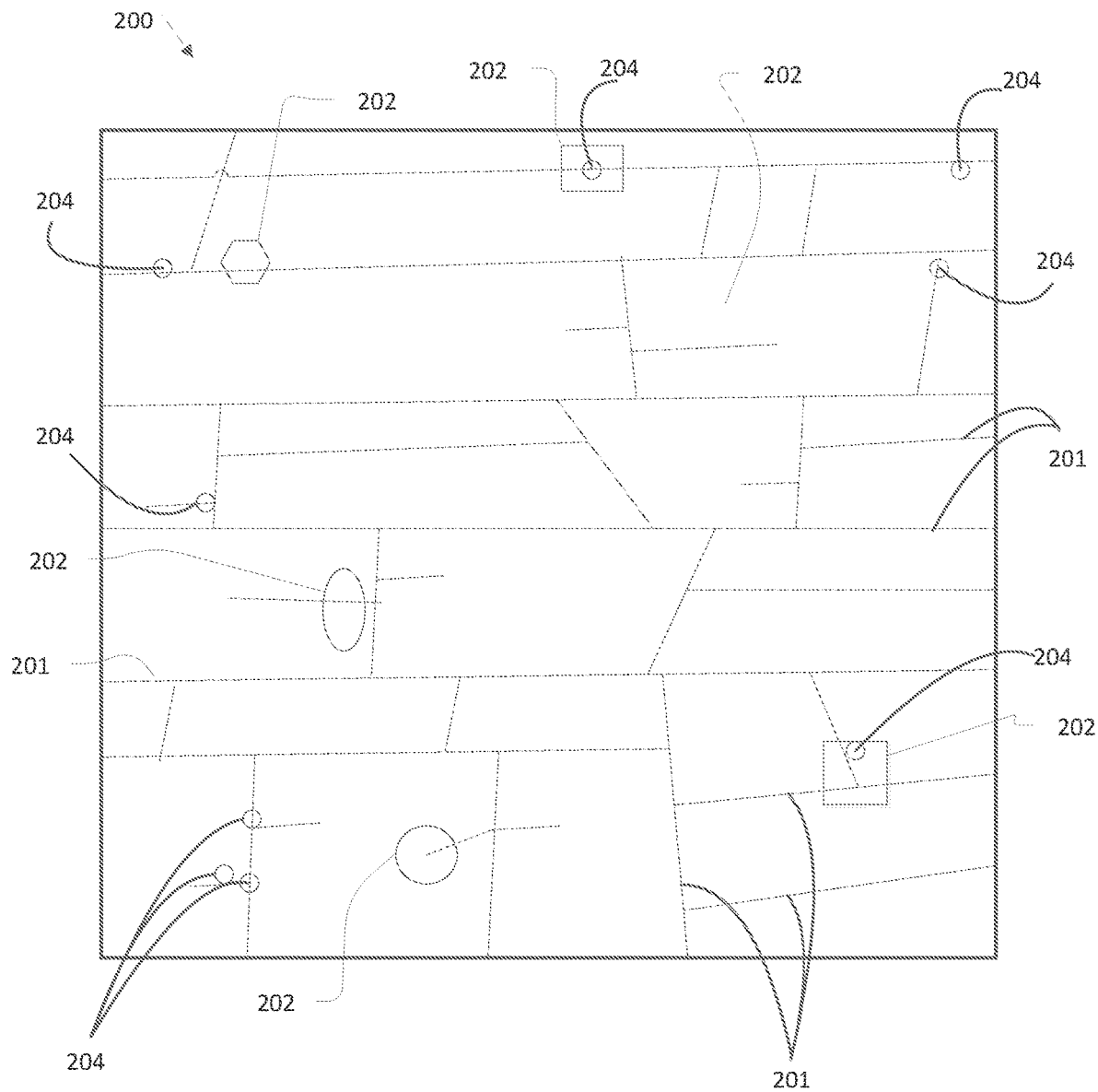
FIG. 2 is an example of a hydrant zone map employed by the monitoring system and/or the monitoring device of FIG. 1.

An example of a hydrant zone map, generally indicated at 200, is illustrated in FIG. 2. A similar map may be employed for use in monitoring other activities or tank fill events or tank discharge events associated with a facility, such as collection of fats and/or oils from fats and/or oils interceptors, collection of waste from one or more septic tanks, collection of trade waste from sewer systems.

As shown in FIG. 2, the hydrant zone map 200 depicts a plurality of fluid pipes 201 in a network of fluid pipes (as indicated by dashed lines for clarity). In some embodiments, the hydrant zone map 200 may depict a plurality of roads or streets instead of or in addition to the fluid pipes 201. The hydrant zone map 200 includes a plurality of zones 202, each zone 202 corresponding to a virtual geographical boundary, which is also sometimes called a geofence, associated with a physical geographical area in which at least one water hydrant is physically located. In some embodiments, the geofence may be defined by a set of boundaries, for example, a radius distance from a central point and/or latitude and longitude ranges. The presence of a water carrying vehicle within a zone may be represented by the vehicle identifier or an icon 204. In some embodiments, the hydrant zone map 200 may be in the form of a mapping table or may be in the form of an interactive or dynamic map. In some embodiments, the hydrant zone map 200 may be displayed to a user via the user interface 128 and/or the user interface 142 or may be accessible to a user at the remote computing device 148 via the communications interface 140.

Figure 3:
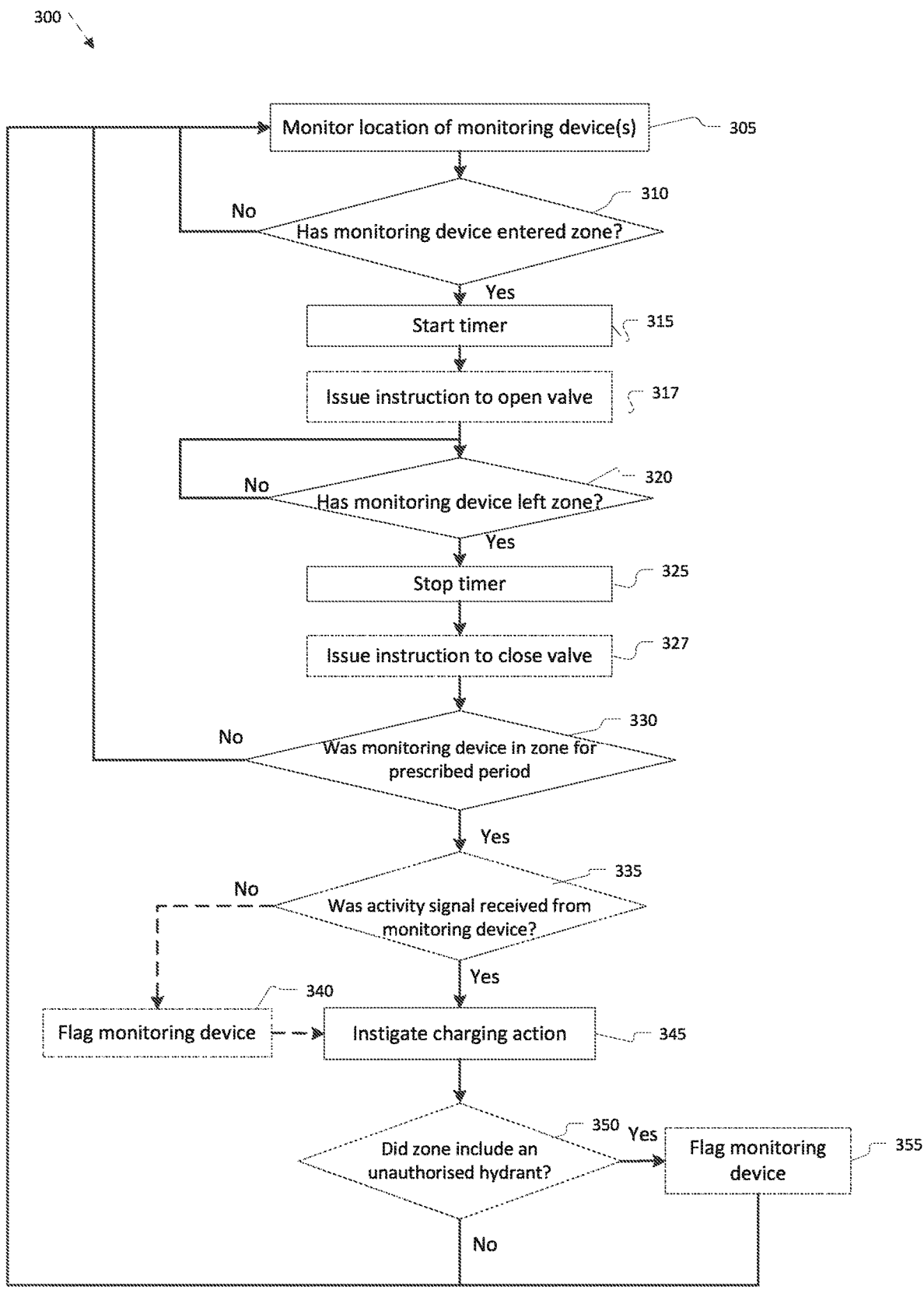
FIG. 3 is a flow diagram of a method of monitoring of an activity at one or more facilities, the method being implemented by the monitoring system or the monitoring device of FIG. 1, according to some embodiments.

FIG. 3 is a flow diagram of a method 300 of monitoring an activity at one or more facilities by a vehicle associated with or co-located with the monitoring device 102 according to some embodiments. For example, the activity may comprise hydrant usage, collection of fats and/or oils from one or more fats and/or oils interceptors of the facility, collection of waste from one or more septic tanks of the facility and/or collection of trade waste from sewer systems associated with the facility. The method may be performed by monitoring system 104, the monitoring device 102 and/or a combination of monitoring system 104 and the monitoring device 102. For example, in some embodiments, the processor 134 may be configured to execute program code to cause the monitoring unit 132 of the monitoring system 104 to perform the method 300 of monitoring of the activity at the one or more facilities. In some embodiments, the processor 114 may be configured to execute program code to cause the controller 108 of the monitoring device 102 to perform the method 300 of monitoring of the activity at the one or more facilities.

At 305, a location of at least one of the plurality of monitoring devices 102 is monitored by the monitoring system 104 or by the monitoring device 102. For example, in some embodiments, the processor 134 executes program code to cause the monitoring unit 132 to process data, including location data, received from the monitoring device 102 via the communications interface 140 across the communications network 106, to monitor the location of the monitoring device 102. In some embodiments, the processor 114 executes program code to cause the controller 108 of the monitoring device 102 to process satellite data received from the GPS receiver 112 to determine location data to monitor the location of the monitoring device 102.

At 310, it is determined whether the monitoring device 102, and accordingly, a vehicle associated with or co-located with the monitoring device 102, has entered a zone 202. For example, in some embodiments the processor 134 executes program code to cause the monitoring unit 132 to determine whether the vehicle associated with the monitoring device 102 has entered a zone 202 by comparing the location data with the zone map 200. In some embodiments, the processor 114 executes program code to cause the controller 108 of the monitoring device 102 to determine whether the vehicle associated with the monitoring device 102 has entered a zone 202 by comparing the location data with the zone map 200. If the monitoring unit 132 or controller 108 determines that the vehicle associated with the monitoring device 102 has not entered a zone 202, the method reverts to 305.

If it is determined that the monitoring device 102 and accordingly, the vehicle associated with or co-located with the monitoring device 102, has entered a zone 202, a timer is started to record time spent by the vehicle in the zone 202, at 315. For example, in some embodiments, the processor 134 executes program code to cause the monitoring unit 132 to start a timer to record time spent by the vehicle in the zone 202 and in some embodiments, the processor 114 executes program code to cause the controller 108 to start a timer to record time spent by the vehicle in the zone 202.

In some embodiments, when it is determined that the monitoring device 102 and accordingly, the vehicle associated with or co-located with the monitoring device 102, has entered the zone 202, an instruction is issued to a valve control mechanism (not shown) of a tank or tanker of the vehicle to cause a valve (not shown) of the tank or tanker to open to allow for fluid to be conveyed to or from the tank or tanker, at 317. For example, the processor 134 may execute program code to cause the monitoring unit 132 to issue the direction to the valve control mechanism (not shown) or the processor 114 may execute program code to cause the controller 108 to issue the direction to the valve control mechanism (not shown).

At 320, the location data is monitored to determine whether the monitoring device 102 and accordingly, the vehicle associated with or co-located with the monitoring device 102, has left the zone 202. For example, in some embodiments, the processor 134 executes program code to cause the monitoring unit 132 to determine that the vehicle associated with the monitoring device 102 has left the zone 202 by comparing current or recently received location data from the monitoring device 102 with the zone map 200. In some embodiments, the processor 114 executes program code to cause the controller 108 to determine that the vehicle associated with the monitoring device 102 has left the zone 202 by comparing current location data with the zone map 200.

At 325, if it is determined that the vehicle associated with the monitoring device 102 has left the zone 202, the timer is stopped. For example, in some embodiments, if the monitoring unit 132 determines that the vehicle associated with the monitoring device 102 has left the zone 202, the processor 134 executes program code to cause the monitoring unit 132 to stop the timer. In some embodiments, if the controller 108 determines that the vehicle associated with the monitoring device 102 has left the zone 202, the processor 114 executes program code to cause the controller 108 to stop the timer.

In some embodiments, when it is determined that the monitoring device 102 and accordingly, the vehicle associated with or co-located with the monitoring device 102, has left the zone 202, an instruction is issued to the valve control mechanism (not shown) of the tank or tanker of the vehicle to cause the valve (not shown) of the tank or tanker to close to prevent or disallow fluid to be conveyed to or from the tank or tanker, at 327. For example, the processor 134 may execute program code to cause the monitoring unit 132 to issue the direction to the valve control mechanism (not shown) or the processor 114 may execute program code to cause the controller 108 to issue the direction to the valve control mechanism (not shown).

At 330, it is determined whether the vehicle associated with the monitoring device 102 was in the zone 202 for a prescribed period of time. A suitable prescribed period of time is discussed below with reference to FIGS. 4 and 5.

In some embodiments, the processor 134 executes program code to cause the monitoring unit 132 to determine that the vehicle associated with the monitoring device 102 was in the zone 202 for a prescribed period of time by comparing the recorded time spent by the vehicle in the zone 202 with a threshold value, for example, as may be stored in data memory 144. In some embodiments, the processor 114 executes program code to cause the controller 108 to determine that the vehicle associated with the monitoring device 102 was in the zone 202 for a prescribed period of time by comparing the recorded time spent by the vehicle in the zone 202 with a threshold value, for example, as may be stored in data memory 131.

If it is determined that the vehicle associated with the monitoring device 102 was not within the zone 202 for the prescribed period, the method reverts to 305. If it is determined that the vehicle associated with the monitoring device 102 was in the zone 202 for the prescribed period of time, the method may proceed to 335 or 345.

For example, in some embodiments, at 335, it is determined whether a signal indicating the occurrence of a tank fill event or tank discharge event has been received from the user interface 128, such as from the button 130, of the monitoring device 102 within a specified time since the vehicle associated with the monitoring device 102 was determined to have entered the zone 202. In some embodiments, the processor 134 executes program code to cause the monitoring unit 132 to determine whether the signal indicating the occurrence of a tank fill event or tank discharge event has been received. In some embodiments, the processor 114 executes program code to cause the controller 108 to determine whether the signal indicating the occurrence of a tank fill event or tank discharge event has been received. For example, the specified time may be the prescribed time plus five minutes.

If it is determined that a signal indicating the occurrence of a tank fill event or tank discharge event has not been received, the vehicle can be flagged as a potential charge avoider, for example, by recording the non-activation of the button 130 by the driver of the vehicle, at 340 and the method may then proceed to 345. For example, the processor 134 may execute code to cause the monitoring unit 132 to flag the vehicle as a potential charge avoider or the processor 114 may execute code to cause the controller 108 to flag the vehicle as potential as a potential charge avoider. However, if it is determined that an input indicating the occurrence of a tank fill event or tank discharge event has been received, the method then proceeds to 345.

At 345, a charging action is instigated. In some embodiments, the processor 134 executes program code to cause the monitoring unit 132 to instigate or cause the charging action. In some embodiments, the processor 114 executes program code to cause the controller 108 to instigate or cause the charging action, for example, by transmitting from the communications interface 110 an instruction or command across the communications network 106 to the monitoring system 104 or a debiting or accounting system. Various ways in which the monitoring unit 132 may instigate a charging action are discussed in more detail below with reference to FIG. 4.

In some embodiments, prior to issuing the charging action at 345, the processor 134 executes program code to cause the monitoring unit 132 to send a message, such as a text message or an email, to the monitoring device 102 and/or a computing device 148, such as a SMART phone or Tablet, associated with the driver of the vehicle, requesting confirmation that a tank fill event or tank discharge event occurred, or for example, indicating that a charging action will occur if no response is received from the driver indicating that a tank fill event or tank discharge event did not occur. Similarly, in some embodiments, prior to issuing the charging action at 345, the processor 114 executes program code to cause the controller 108 to send a message, such as a text message or an email, to a computing device 148, such as a SMART phone or Tablet, associated with the driver of the vehicle, requesting confirmation that a tank fill event or tank discharge event occurred, or for example, indicating that a charging action will occur if no response is received from the driver indicating that a tank fill event or tank discharge event did not occur.

If confirmation is received or the driver disputes that a tank fill event or tank discharge event occurred, the method 300 may proceed to 350 or 305 without issuing a charging action. Otherwise, the method 300 may proceed to 345 and the monitoring unit 132 and/or the controller 108 may issue a charging action. Once the monitoring unit 132 and/or controller 108 has instigated the charging action, the method may proceed to 350 or to 305.

In some embodiments where the activity being monitored is hydrant usage, at 350, it is determined whether the zone 202 in which the vehicle was determined to have been for the prescribed period is a zone 202 including an unauthorised or forbidden hydrant. For example, in some embodiments, the processor 134 may execute program code to cause the monitoring unit 132 to determine whether the zone 202 included an unauthorised hydrant by comparing the zone 202 with a list of zones including unauthorised hydrants, for example, as may be stored in data memory 144. Similarly, in some embodiments, the processor 114 may execute program code to cause the controller 108 to determine whether the zone 202 included an unauthorised hydrant by comparing the zone 202 with a list of zones including unauthorised hydrants, for example, as may be stored in data memory 131. If it is determined that the zone 202 does not include an unauthorised hydrant, the method may then proceed to 305. If it is determined that the zone 202 included an unauthorised hydrant, the monitoring unit 132 and/or the controller 108 flags the vehicle as performing unauthorised acts and requiring further investigation, at 355. The method may then proceed to 305.

Figure 4:
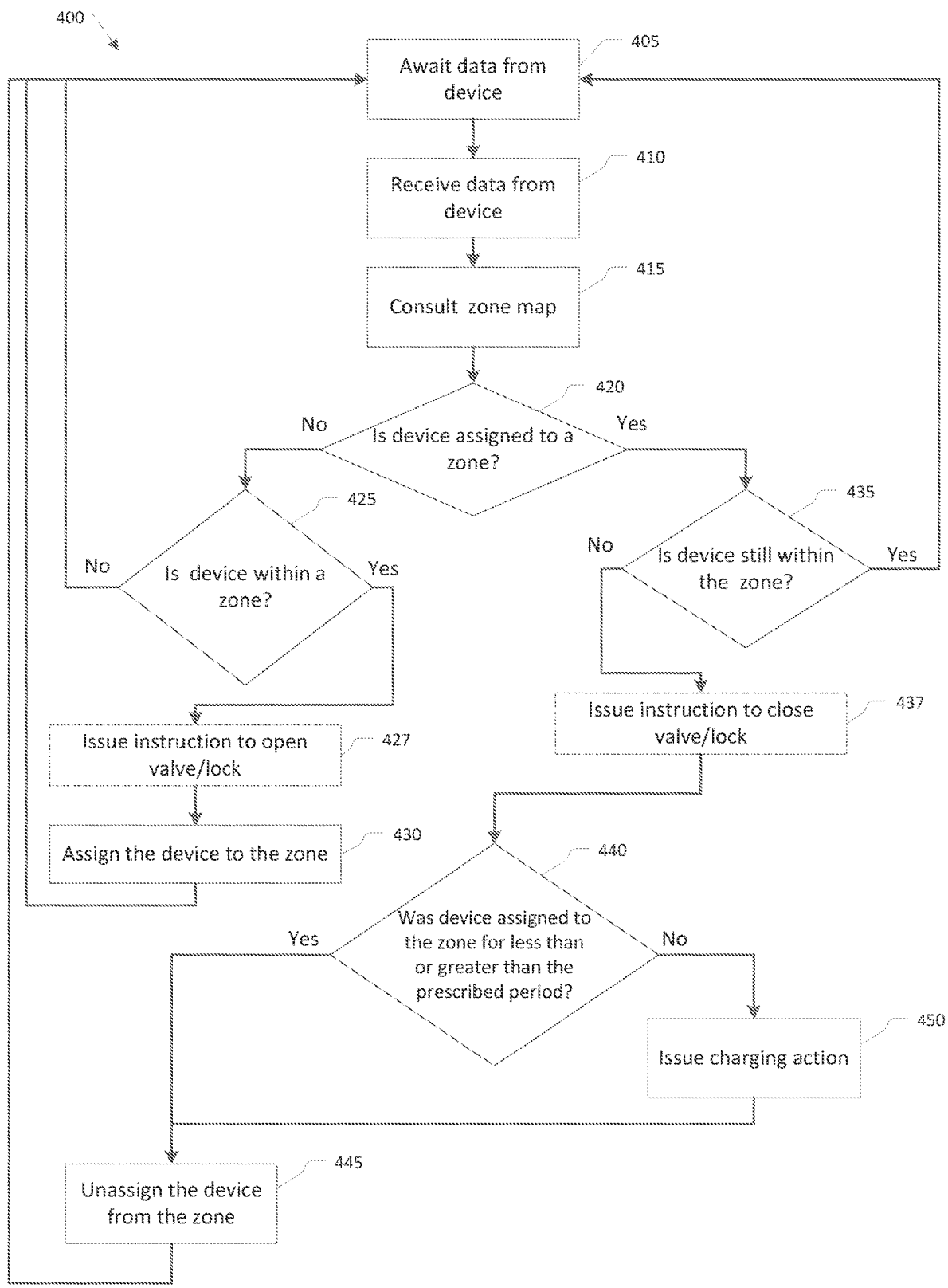
FIG. 4 is a flow diagram of a method of remote monitoring of an activity at one or more facilities, the method being implemented by the monitoring system of FIG. 1, according to some embodiments.

In some embodiments, the processor 134 may be configured to execute program code to cause the monitoring unit 132 of the monitoring system 104 to perform a method 400 of remote monitoring of an activity at one or more facilities, as depicted in the flow diagram of FIG. 4, which may be effectively performed for each incoming data message or packet received from the monitoring device 102. For example, the activity may comprise hydrant usage, collection of fats and/or oils from one or more fats and/or oils interceptors of the facility, collection of waste from one or more septic tanks of the facility and/or collection of trade waste from sewer systems associated with the facility.

At 405, the monitoring system 104 awaits receipt of data from at least one of the plurality of monitoring devices 102 via the communications interface 140 across the communications network 106.

At 410, the monitoring system 104 receives data from a monitoring device 102. In some embodiments the data comprises an identifier, such as a vehicle or monitoring device identifier, and location data. For example, the location data may comprise a location indicator for the monitoring device 102 and in some embodiments, may also include a time stamp. In some embodiments, the monitoring unit 132 applies a time stamp to the data once it is received at the monitoring system 104.

At 415, the processor 134 executes program code to cause the monitoring unit 132 to consult the zone map 200. In some embodiments, the zone map 200 is stored in the data memory 144 and the monitoring unit 132 accesses the data memory 144 to consult the zone map 200. In some embodiments, the zone map 200 is stored at the remote database 146 and the monitoring unit 132 accesses the remote database 146 via the communications interface 140 to consult the zone map 200. In some embodiments, the zone map 200 is stored in an external memory device (not shown) and the monitoring unit 132 accesses the external memory device via a memory interface (not shown) of the communications interface 140 to consult the zone map 200.

At 420, the monitoring unit 132 determines whether or not the monitoring device 102 is assigned to a zone of the zone map 200, that is logged into or recorded as being located within the zone. In some embodiments, the monitoring unit 132 compares the identifier with the zone map 200 to determine whether the vehicle or monitoring device 102 has been assigned to a zone 202, for example, by recording the identifier as being located within a zone 202 of the zone map 200.

If the monitoring unit 132 determines that the monitoring device 102 is not assigned to a zone 202, the processor 134 executes program code to cause the monitoring unit 132 to determine whether the device 102 is within a zone of the zone map 200, at 425. In some embodiments, the monitoring unit 132 compares the location indicator for the monitoring device 102 with a geofence associated with at least one zone 202 of the zone map 200 to determine whether the location indicator represents a location within the geofence of a zone 202 of the zone map 200.

If, following 425, the monitoring unit 132 determines that the monitoring device 102 is not within a zone of the zone map 200, the method reverts to 405 and the monitoring system 104 awaits receipt of data from at least one of the plurality of monitoring devices 102.

If the monitoring unit 132 determines that the monitoring device 102 is within a zone 202 of the zone map 200 at 425, the processor 134 executes program code to cause the monitoring unit 132 to assign the monitoring device 102 to the zone 202, for example, by recording the identifier as being located within the zone 202 of the zone map 200 having a geofence which includes the geographical location corresponding to that represented by the location indicator, at 430.

In some embodiments, if the monitoring unit 132 determines that the monitoring device 102 is within the zone 202 of the zone map 200 at 425, the processor 134 may execute program code to cause the monitoring unit 132 to issue an instruction to a valve control mechanism (not shown) of a tank or tanker of the vehicle to cause the valve (not shown) of the tank or tanker to open to allow for fluid to be conveyed to or from the tank or tanker, at 427. For example, in some embodiments, the monitoring unit 132 may issue the instruction to the monitoring device 102 to cause the monitoring device to activate the valve control mechanism (not shown) to open the valve.

In some embodiments, if the controller 108 determines that the monitoring device 102 is within the zone 202 of the zone map 200 at 525, the processor 134 may execute program code to cause the monitoring unit 132 to issue an instruction to control a component or mechanism (not shown), such as a valve mechanism or lock mechanism, of or associated with the one or more facilities to allow the activity to be performed, at 427. For example, the mechanism may be a lock mechanism (not shown), and the processor 134 may execute program code to cause the monitoring unit 132 to issue an instruction to the lock mechanism to cause the lock mechanism to unlock to allow fluid to be conveyed from or to the facility. In some embodiments, the monitoring unit 132 may issue the instruction to the monitoring device 102 to cause the monitoring device 102 to control or activate the mechanism and allow the activity to be performed. For example, the mechanism may be a lock on one or more interceptors, septic tanks, manholes of sewer systems and/or gates, fences, or doors associated with the one or more facilities.

At 420, if the monitoring unit 132 determines that the monitoring device 102 is assigned to a zone 202, the processor 134 executes program code to cause the monitoring unit 132 to determine whether the monitoring device 102 is still within the zone 202 of the zone map 200, at 435.

If the monitoring unit 132 determines that the monitoring device 102 is still within the zone 202, the method reverts to 405 and the monitoring system 104 awaits receipt of data from at least one of the plurality of monitoring devices 102.

If the monitoring unit 132 determines that the monitoring device 102 is not still within the zone 202, the processor 134 executes program code to cause the monitoring unit 132 to determine whether the monitoring device 102 was assigned to the zone 202 for less than or greater than a prescribed period at 440, such as a period deemed consistent with drawing a tank of water from a hydrant, collecting fats and/or oils from one or more fats and/or oils interceptors, collecting waste from one or more septic tanks, and/or collecting trade waste from sewer systems as applicable. For example, if the monitoring device 102 was not within the zone 202 for a sufficient length of time, it is considered unlikely that the activity occurred. Similarly, if the monitoring device 102 was within the zone 202 for longer than the prescribed period, it is considered likely that an event other than the activity was occurring.

In some embodiments, if the monitoring unit 132 determines that the monitoring device 102 is not still within the zone 202 of the zone map 200 at 435, the processor 134 may execute program code to cause the monitoring unit 132 to issue an instruction, directly or indirectly, to the valve control mechanism (not shown) of the tank or tanker of the vehicle to cause the valve (not shown) of the tank or tanker to close to prevent or disallow fluid to be conveyed to or from the tank or tanker, at 437. For example, in some embodiments, the monitoring unit 132 may issue the instruction to the monitoring device 102 to cause the monitoring device 102 to activate the valve control mechanism (not shown) to close the valve. In some embodiments, if the controller 108 determines that the monitoring device 102 is not still within the zone 202 of the zone map 200 at 435, the processor 134 may execute program code to cause the monitoring unit 132 to issue an instruction to control the component or mechanism (not shown) of or associated with the one or more facilities to prevent or disallow the activity from being performed, at 437. For example, the mechanism may be a lock mechanism (not shown), and the processor 114 may execute program code to cause the monitoring unit 132 to issue an instruction to the lock mechanism to cause the lock mechanism to lock to disallow fluid to be conveyed from or to the facility. In some embodiments, the monitoring unit 132 may issue the instruction to the monitoring device 102 to cause the monitoring device 102 to control or activate the mechanism and disallow the activity to be performed.

If the monitoring unit 132 determines that the monitoring device 102 was assigned to the zone 202 for less than the prescribed period, or that the monitoring device 102 was assigned to the zone 202 for greater than the prescribed period, the processor 134 executes program code to cause the monitoring unit 132 to unassign the monitoring device 102 from zone 202 of the zone map 200, for example, by recording the identifier as no longer being located within the zone 202, at 445, and the method reverts to 405.

If the monitoring unit 132 determines that the monitoring device 102 was assigned to the zone 202 for a period of time falling within the prescribed period, i.e., not a period of time less than or greater than the prescribed period, the monitoring unit 132 determines that the activity has been performed at the one or more facilities in the zone 202 and the processor 134 may execute program code to cause the monitoring unit 132 to issue a charging action, at 550.

In some embodiments, prior to issuing the charging action at 450, the processor 134 executes program code to cause the monitoring unit 132 to send a message such as a text message or an email to the monitoring device and/or a computing device 148, such as a smart phone or Tablet, associated with the driver of the vehicle, requesting confirmation that an activity such as a tank fill event or tank discharge event, occurred, or for example, indicating that a charging action will occur if no response is received from the driver indicating that the activity did not occur. If the driver disputes that the activity occurred, the method 400 may proceed to 445 without issuing a charging action. Otherwise, the method 400 may proceed to 450 and the monitoring unit 132 may issue a charging action.

In some embodiments, issuing a charging action comprises the monitoring unit 132 creating an entry in a charging record for a company or driver associated with the vehicle to record the activity. For example, the charging record may be stored locally in the data memory 144, at the remote database 146, at the data memory 131 of the monitoring device 102 and/or in an external memory device (not shown) and may be later retrieved by the monitoring unit 132 or another computing device to create and issue an invoice to the company. In some embodiments, issuing a charging action comprises the monitoring unit 132 transmitting an invoice for the activity to a computing device of a company or driver associated with the vehicle, such as computing device 148. In some embodiments, issuing a charging action comprises transmitting an instruction to a computing device of a bank or financial institution, such as computing device 148, to debit a cost of the activity from an account associated with company or driver associated with the vehicle.

Before, concurrently, or after the charging action is issued, the processor 134 executes program code to cause the monitoring unit 132 to unassign the monitoring device 104 from the zone 202 of the zone map 200, for example, by recording the identifier as no longer being located within the zone 202, at 445, and the method reverts to 405.

Figure 5:
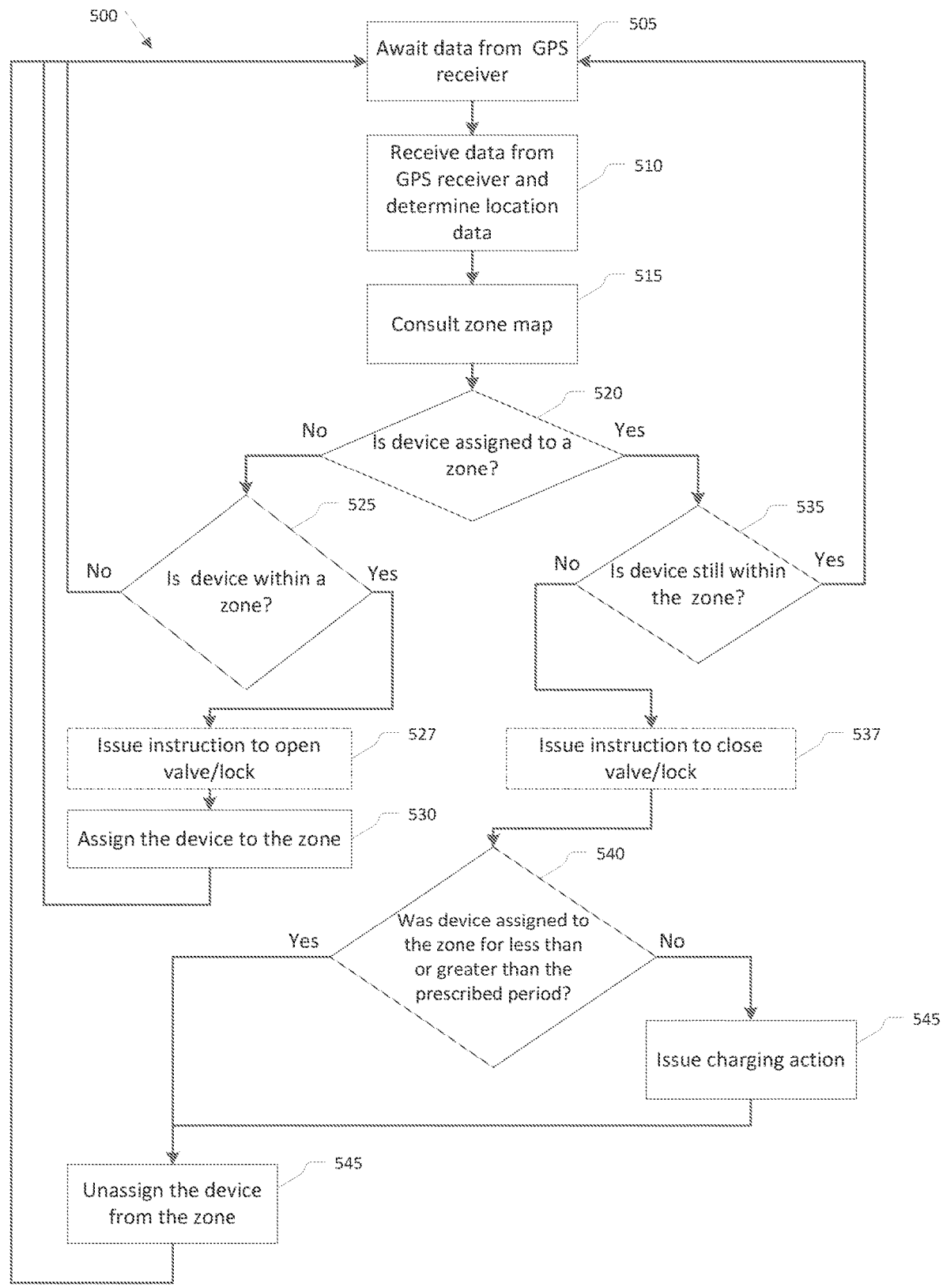
FIG. 5 is a flow diagram of a method of monitoring of an activity at one or more facilities, the method being implemented by the monitoring device of FIG. 1, according to some embodiments.

In some embodiments, the processor 114 may be configured to execute program code to cause the controller 108 of the monitoring device 102 to perform a method 500 of monitoring an activity at one or more facilities, as depicted in the flow diagram of FIG. 5, which may be effectively performed for at least some of the satellite data received by the GPS receiver 112. For example, the activity may comprise hydrant usage, collection of fats and/or oils from one or more fats and/or oils interceptors of the one or more facilities, collection of waste from one or more septic tanks of the one or more facilities and/or collection of trade waste from sewer systems associated with the one or more facilities.

At 505, the monitoring device 102 awaits receipt of data from GPS satellites indicating location information specifying the geographic location of the GPS receiver 112 at a given time via the GPS receiver 112.

At 510, the monitoring device 102 receives data from GPS satellites and processes the data to determine location data. For example, the location data may comprise a location indicator for the monitoring device 102 and in some embodiments, may also include a time stamp. In some embodiments, the monitoring device 102 applies a time stamp to the data.

At 515, the processor 114 executes program code to cause the controller 108 to consult the zone map 200. In some embodiments, the zone map 200 is stored in the data memory 131 and the controller 108 accesses the data memory 131 to consult the zone map 200. In some embodiments, the zone map 200 is stored at the remote database 146 and the controller 108 accesses the remote database 146 via the communications interface 110 to consult the zone map 200. In some embodiments, the zone map 200 is stored in an external memory device (not shown) and the controller 108 accesses the external memory device via a memory interface (not shown) of the communications interface 110 to consult the zone map 200.

At 520, the controller 108 determines whether or not the monitoring device 102 is assigned to a zone 202 of the zone map 200, that is logged into or recorded as being located within a zone 202 of the zone map 200. In some embodiments, the controller 108 compares an identifier of the monitoring device 102 or the associated vehicle with the zone map 200 to determine whether the vehicle or monitoring device 102 has been assigned to a zone 202, for example, by recording the identifier as being located within a zone 202 of the zone map 200.

If the controller 108 determines that the monitoring device 102 is not assigned to a zone 202, the processor 114 executes program code to cause the controller 108 to determine whether the device 102 is within a zone of the zone map 200, at 525. In some embodiments, the controller 108 compares the location indicator for the monitoring device 102 with a geofence associated with at least one zone 202 of the zone map 200 to determine whether the location indicator represents a location within the geofence of a zone 202 of the zone map 200.

If, following 525, the controller 108 determines that the monitoring device 102 is not within a zone of the zone map 200, the method reverts to 505 and the monitoring device 102 awaits receipt of data.

If the controller 108 determines that the monitoring device 102 is within a zone 202 of the zone map 200 at 525, the processor 114 executes program code to cause the controller 108 to assign the monitoring device 102 and/or associated vehicle to the zone 202, for example, by recording an identifier of the monitoring device 102 and/or vehicle as being located within the zone 202 of the zone map 200 having a geofence which includes the geographical location corresponding to that represented by the location indicator, at 530.

In some embodiments, if the controller 108 determines that the monitoring device 102 is within the zone 202 of the zone map 200 at 525, the processor 114 may execute program code to cause the controller 108 to issue an instruction to a valve control mechanism (not shown) of a tank or tanker of the vehicle to cause the valve (not shown) of the tank or tanker to open to allow for fluid to be conveyed to or from the tank or tanker, at 527. In some embodiments, if the controller 108 determines that the monitoring device 102 is within the zone 202 of the zone map 200 at 525, the processor 114 may execute program code to cause the controller 108 to issue an instruction to a component or mechanism (not shown), such as a valve mechanism or lock mechanism, of or associated with the one or more facilities to allow the activity to be performed, at 527. For example, the component may be a lock mechanism (not shown), and the processor 114 may execute program code to cause the controller 108 to issue an instruction to the lock mechanism to cause the lock mechanism to unlock to allow fluid to be conveyed from or to the one or more facilities.

At 520, if the controller 108 determines that the monitoring device 102 is assigned to a zone 202, the processor 114 executes program code to cause the controller 108 to determine whether the monitoring device 102 is still within the zone 202 of the zone map 200, at 535.

If the controller 108 determines that the monitoring device 102 is still within the zone 202, the method reverts to 505 and the monitoring device 102 awaits receipt of data.

If the controller 108 determines that the monitoring device 102 is not still within the zone 202, the processor 114 executes program code to cause the controller 108 to determine whether the monitoring device 102 was assigned to the zone 202 for less than or greater than a prescribed period at 540, such as a period deemed consistent with drawing a tank of water from a hydrant, collecting fats and/or oils from one or more fats and/or oils interceptors, collecting waste from one or more septic tanks, and/or collecting trade waste from sewer systems, as applicable. For example, if the monitoring device 102 was not within the zone 202 for a sufficient length of time, it is considered unlikely that the activity occurred. Similarly, if the monitoring device 102 was within the zone 202 for longer than the prescribed period, it is considered likely that an event other than the activity was occurring.

In some embodiments, if the controller 108 determines that the monitoring device 102 is not still within the zone 202 of the zone map 200 at 535, the processor 114 may execute program code to cause the controller 108 to issue an instruction to the valve control mechanism (not shown) of the tank or tanker of the vehicle to cause the valve (not shown) of the tank or tanker to close to prevent or disallow fluid to be conveyed to or from the tank or tanker, at 537. In some embodiments, if the controller 108 determines that the monitoring device 102 is not still within the zone 202 of the zone map 200 at 535, the processor 114 may execute program code to cause the controller 108 to issue an instruction to the component or mechanism (not shown) of or associated with the one or more facilities to prevent or disallow the activity to be performed, at 537. For example, the mechanism may be a lock mechanism (not shown), and the processor 114 may execute program code to cause the controller 108 to issue an instruction to the lock mechanism to cause the lock mechanism to lock to disallow fluid to be conveyed from or to the facility.

If the controller 108 determines that the monitoring device 102 was assigned to the zone 202 for less than the prescribed period, or that the monitoring device 102 was assigned to the zone 202 for greater than the prescribed period, the processor 114 executes program code to cause the controller 108 to unassign the monitoring device 102 from the zone 202 of the zone map 200, for example, by recording the identifier as no longer being located within the zone 202, at 545, and the method reverts to 505.

If the controller 108 determines that the monitoring device 102 was assigned to the zone 202 for a period of time falling within the prescribed period, i.e., not a period of time less than or greater than the prescribed period, the controller 108 determines that the activity has been performed at the one or more facilities in the zone 202 and the processor 114 may execute program code to cause the controller 108 to issue a charging action, at 550.

In some embodiments, prior to issuing the charging action at 550, the processor 114 executes program code to cause the controller 108 to send a message such as a text message or an email to a computing device 148, such as a smart phone or Tablet, associated with the driver of the vehicle, requesting confirmation that the activity occurred, or for example, indicating that a charging action will occur if no response is received from the driver indicating that the activity did not occur. If the driver disputes that the activity occurred, the method 500 may proceed to 545 without issuing a charging action. Otherwise, the method 500 may proceed to 550 and the controller 108 may issue a charging action.

In some embodiments, issuing a charging action comprises the controller 108 creating an entry in a charging record for a company or driver associated with the vehicle to record the activity. For example, the charging record may be stored locally in the data memory 131, at the remote database 146, at the data memory 144 of the monitoring system 104 and/or in an external memory device (not shown) and may be later retrieved by the controller 108 or another computing device to create and issue an invoice to the company. In some embodiments, issuing a charging action comprises the controller 108 transmitting an invoice for the activity to a computing device of a company or driver associated with the vehicle, such as computing device 148. In some embodiments, issuing a charging action comprises transmitting an instruction to a computing device of a bank or financial institution, such as computing device 148, to debit a cost of the activity from an account associated with company or driver associated with the vehicle.

Before, concurrently, or after the charging action is issued, the processor 114 executes program code to cause the controller 108 to unassign the monitoring device 104 from the zone 202 of the zone map 200, for example, by recording the identifier as no longer being located within the zone 202, at 545, and the method reverts to 505.

A prescribed period parameter is associated with a value for the prescribed period and may be stored in the data memory 144, where it is accessible to the processor 134 and/or in the data memory 131, where it is accessible to the processor 114. The prescribed period is a set period of time within which it is considered reasonable for the activity to occur. For example, in some embodiments, the prescribed period includes a lower threshold value and an upper threshold value. The lower threshold value may be set at a shortest duration of time for which it is considered that the activity could occur. For example, the lower threshold value may be set at approximately five minutes. The higher threshold value may be set at a longest duration of time for which it is considered that the activity would be occurring and may also take into consideration or account some time for driver procrastination or time wasting. For example, the higher threshold value may be set at approximately fifteen minutes. By including a higher threshold value, false positive determinations of the activity being performed may be mitigated. In some embodiments, the prescribed period values may depend on the activity. For example, a vehicle recorded as being within a zone 202 for greater than the higher threshold value is unlikely to be sourcing water from the hydrant and is more likely to be parked at the location for another reason. In some embodiments, the prescribed period values may depend on a size of the area of the physical geographical area associated with a given zone.

In some embodiments, the prescribed period parameter value may vary depending on the zone 202 to which the vehicle is assigned. For example, the prescribed period parameter value for one zone 202 may differ from the prescribed period parameter value of a neighbouring zone 202 to account for traffic or parking difficulties which may affect a length of time a vehicle may be required to remain in the zone 202 in order to perform the activity.

In some embodiments, the prescribed period parameter value may vary depending on the vehicle or monitoring device identifier. For example, the prescribed period parameter value for one vehicle or driver may differ from that of another vehicle and/or driver to account for differing tank sizes or capacities, vehicle restrictions and/or driver disabilities which may affect a length of time a vehicle may be required to remain in the zone 202 in order to perform the activity.

For example, a vehicle/driver record (not shown) may be stored in the data memory 144 and/or in the data memory 131 to record details associated with the vehicle and/or driver, such as tank sizes or capacities, vehicle restrictions and/or driver disabilities. Furthermore, the vehicle/driver record may include details of locations where the driver may be likely to spend time, such as the driver's home address or regular parking spot, and these locations may be flagged as false positives by the monitoring unit 132 and/or the controller 108 or may be "blacked out" or removed from the zones 202 of the zone map 200 for that particular driver as driver permitted locations.

In some embodiments, the vehicle/driver record may store driver behaviour information such as instances of where the button 130 was not activated by the driver despite the vehicle having been identified as having performed the activity by method 300, method 400 and/or method 500 and/or instances of the driver rejecting charges. This information may be employed to identify drivers whose behaviour deviates from their peers and whose behaviour may warrant investigation.

In some embodiments, the prescribed period parameter(s) for the zones 202 and/or vehicles or monitoring device 102 may be set by the monitoring unit 132 and/or the controller 108 in response to an input received from a user at the user interface 142 or in response to receipt of an authorised instruction received by the monitoring unit 132 from a remote computing device 148 via communications interface 140 and/or by the controller 108 from a remote computing device 148 via communications interface 110.

In some embodiments, other indications of activities being or having been performed, i.e., non-location related data, may be received at the monitoring system 104 from the monitoring device 102 and/or received by the controller 108 via user interface 128 and may be employed to configure, reconfigure or set prescribed period parameter values, virtual geographical boundary or geofence parameter values and/or create of modify vehicle or driver information stored in the data memory 144 and/or the data memory 131.

For example, a driver of the vehicle may activate the button 130 of the user interface 128 of the monitoring device 102 when an activity is performed. In some embodiments, in response to receiving a signal from the button 130, the processor 114 may execute program code to cause the controller 108 to transmit an indication of the performance of the activity by the vehicle via the communications interface 110 to the communications interface 140 of the monitoring system 104.

Alternatively or in addition, a sensor (not shown), such as a float switch or a level sensor, for example, a pressure transducer may be disposed in or at a tank of the vehicle and may be arranged to transmit an output signal to the monitoring device 102 when activated, i.e., as a result of the tank being filled. In some embodiments, in response to receiving the output signal from the sensor (not shown), the processor 114 may execute program code to cause the controller 108 to transmit an indication of a tank fill event by the vehicle via the communications interface 110 to the communications interface 140 of the monitoring system 104.

These additional indications of an occurrence of activities being or having been performed may be interpreted by the monitoring unit 132 of the monitoring system 104 and/or the controller 108 of the monitoring device 102 as positive indications of parameter values, such as prescribed period parameter values and geofence parameter values, identifying when an activity is performed and may be employed to configure, reconfigure or set prescribed period parameter values and/or geofence parameter values.

In some embodiments, the positive indications may be employed to fine tune or verify a determination made using method 300, method 400 and/or method 500. For example, if it is determined likely that an activity was performed, i.e., the monitoring device 102 was logged into a zone 202 for a duration of time falling within the prescribed period, and a non-location related data indication of the activity occurring is received, it may be determined with greater certainty that the activity was performed.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A monitoring system for remote monitoring of a fluid transfer activity performed at one or more facilities by a vehicle, the monitoring system comprising:
   a monitoring unit including program memory and a processor, the program memory accessible by the processor to execute instructions stored therein; and
   a communications interface for communicating with a remote device across a communications network, the remote device being co-located with the vehicle;
   wherein the processor is configured to execute instructions stored in the program memory to:
   receive, at the communications interface, data from the remote device, the data comprising a vehicle identifier and a vehicle location indicator;
   access a zone data record, the zone data record comprising a plurality of zones, each zone having a virtual geographical boundary associated with a physical geographical area including one or more facilities;
   determine that the vehicle is located within a zone of the zone data record for a preconfigured period of time based on the vehicle location indicator and the zone data record;
   responsive to determining that the vehicle is located within the zone for the preconfigured period, determine that the fluid transfer activity has been performed at the one or more facilities by the vehicle and transmit a message to the remote device, to be responded to by a user, requesting confirmation that a tank is being filled; and
   responsive to not receiving, within a predetermined period of time, a response from the remote device confirming that the tank is being filled, record information indicating that the response has not been received in a data record associated with the vehicle.

2. The monitoring system of claim 1, wherein the preconfigured period of time comprises a time range having a lower threshold value and an upper threshold value, and wherein the vehicle is determined to be located within a zone of the zone data record for a preconfigured period of time when the vehicle is determined to be located within the zone for a time period that falls within the time range.

3. The monitoring system of claim 1, wherein the preconfigured period of time is based on at least one of a vehicle identifier, capacity of a tank associated with the vehicle, zone of the zone data record, and driver details of driver associated with the vehicle.

4. The monitoring system of claim 1, wherein the zone data record comprises a dynamic zone map.

5. The monitoring system of claim 1, wherein a vehicle record is stored in data memory of the monitoring system and comprises information pertaining to the vehicle including at least one of vehicle identifier, driver identifier, tank capacity, vehicle restrictions, driver disabilities, driver details, driver permitted locations and driver behaviour.

6. The monitoring system of claim 1, wherein a facility of the one or more facilities comprises a hydrant, the fluid transfer activity comprises hydrant usage and determining that the fluid transfer activity has been performed comprises determining usage of at least one hydrant by the vehicle.

7. The monitoring system of claim 1, wherein the fluid transfer activity comprises collection of fats and/or oils from one or more fats and/or oils interceptors of the one or more facilities and determining that the fluid transfer activity has been performed comprises determining collection of fats and/or oils from one or more fats and/or oils interceptors of the one or more facilities by the vehicle.

8. The monitoring system of claim 1, wherein the fluid transfer activity comprises collection of waste from one or more septic tanks of the one or more facilities and determining that the fluid transfer activity has been performed comprises determining collection of waste from one or more septic tanks of the one or more facilities by the vehicle.

9. The monitoring system of claim 1, wherein the fluid transfer activity comprises collection of trade waste from sewer systems associated with the one or more facilities and determining that the fluid transfer activity has been performed comprises determining collection of trade waste from sewer systems associated with the one or more facilities by the vehicle.

10. The monitoring system of claim 1, wherein the fluid transfer activity comprises disposal or discharge of fluids from a tank or tanker carried by the vehicle at the one or more facilities and determining that the fluid transfer activity has been performed comprises determining disposal or discharge of fluids from the tank or tanker carried by the vehicle at the one or more facilities.

11. A computer implemented method for remote monitoring of a fluid transfer activity performed at one or more facilities by a vehicle, the method operable by a monitoring system including program memory and a processor, the method comprising:

receiving data at a communications interface of the monitoring system from a remote device across a communications network, the remote device being co-located with the vehicle and the data comprising a vehicle identifier and a vehicle location indicator;

accessing a zone data record, the zone data record comprising a plurality of zones, each zone corresponding to a virtual geographical boundary associated with a physical geographical area including one or more facilities;

determining that the vehicle is located within a zone of the zone data record for a preconfigured period of time based on a comparison of the vehicle location indicator and the zone data record; and responsive to determining that the vehicle is located within the zone for the preconfigured period, determining that the fluid transfer activity has been performed at the one or more facilities by the vehicle and requesting confirmation, to be responded to by a user, that a tank is being filled; and responsive to not receiving, within a predetermined period of time, a response from the remote device confirming that the tank is being filled, recording information indicating that the response has not been received in a data record associated with the vehicle.

12. The method of claim 11, wherein determining that the vehicle is located within a zone of the zone data record for a preconfigured period of time comprises determining a time spent by the vehicle in the zone and comparing the determined time with the preconfigured period of time.

13. The method of claim 12, wherein determining a time spent by the vehicle in the zone comprises responsive to determining that the vehicle is located within a zone of the zone data record, starting a timer and responsive to determining that the vehicle is no longer located within the zone, stopping the timer.

14. The method of claim 11, further comprising transmitting a message to a computing device associated with the vehicle to query whether a tank fill event and/or tank discharge event occurred and responsive to receiving a response from the computing device indicating that a tank fill event and/or tank discharge event did not occur, recording the response in a data record associated with the vehicle.

15. The method of claim 11, further comprising transmitting a message to a computing device associated with the vehicle to query whether a tank fill event and/or tank discharge event occurred and responsive to not receiving a response from the computing device within a predefined period indicating that a tank fill event and/or tank discharge event did not occur, instigating a charging action.

16. The method of claim 11, further comprising responsive to receiving a tank fill event signal and/or tank discharge event signal from the remote device, recording a location identifier of the remote device at that time as a potentially positive indication of a location to be included within a zone of the zone data record.

17. The method of claim 11, further comprising responsive to determining that the monitoring system is located within the zone, issuing an instruction to a valve control mechanism of a tank carried by the vehicle to cause the valve control mechanism to open a valve of the tank to allow for fluid to be conveyed to or from the tank and responsive to determining that the monitoring system is no longer located within the zone, issuing an instruction to the valve control mechanism to cause the valve control mechanism to close the valve of the tank to disallow for fluid to be conveyed to or from the tank.

18. The method of claim 11, further comprising responsive to determining that the monitoring system is located within the zone, issuing an instruction to a mechanism of the one or more facilities to cause the mechanism to unlock to allow for fluid to be conveyed to or from the one or more facilities and responsive to determining that the monitoring system is no longer located within the zone, issuing an instruction to the mechanism to cause the mechanism to lock to disallow for fluid to be conveyed to or from the one or more facilities.

19. A computer program product comprising a non-transitory computer readable medium encoded with computer executable instructions, which when executed in a computer system, is effective to cause the computer system to perform actions including:

accessing data that was received at a communication interface of a monitoring system from a remote device across a communications network, the remote device being co-located with a vehicle and the data comprising a vehicle identifier and a vehicle location indicator;

accessing a zone data record, the zone data record comprising a plurality of zones, each zone corresponding to a virtual geographical boundary associated with a physical geographical area including one or more facilities;

determining that the vehicle is located within a zone of the zone data record for a preconfigured period of time based on a comparison of the vehicle location indicator and the zone data record; and responsive to determining that the vehicle is located within the zone for the preconfigured period, determining that a fluid transfer activity has been performed at the one or more facilities by the vehicle and requesting confirmation, to be responded to by a user, that a tank is being filled; and responsive to not receiving, within a predetermined period of time, a response from the remote device confirming that the tank is being filled, recording information indicating that the response has not been received in a data record associated with the vehicle.

* * * * *